United States Patent Office 3,490,117
Patented Jan. 20, 1970

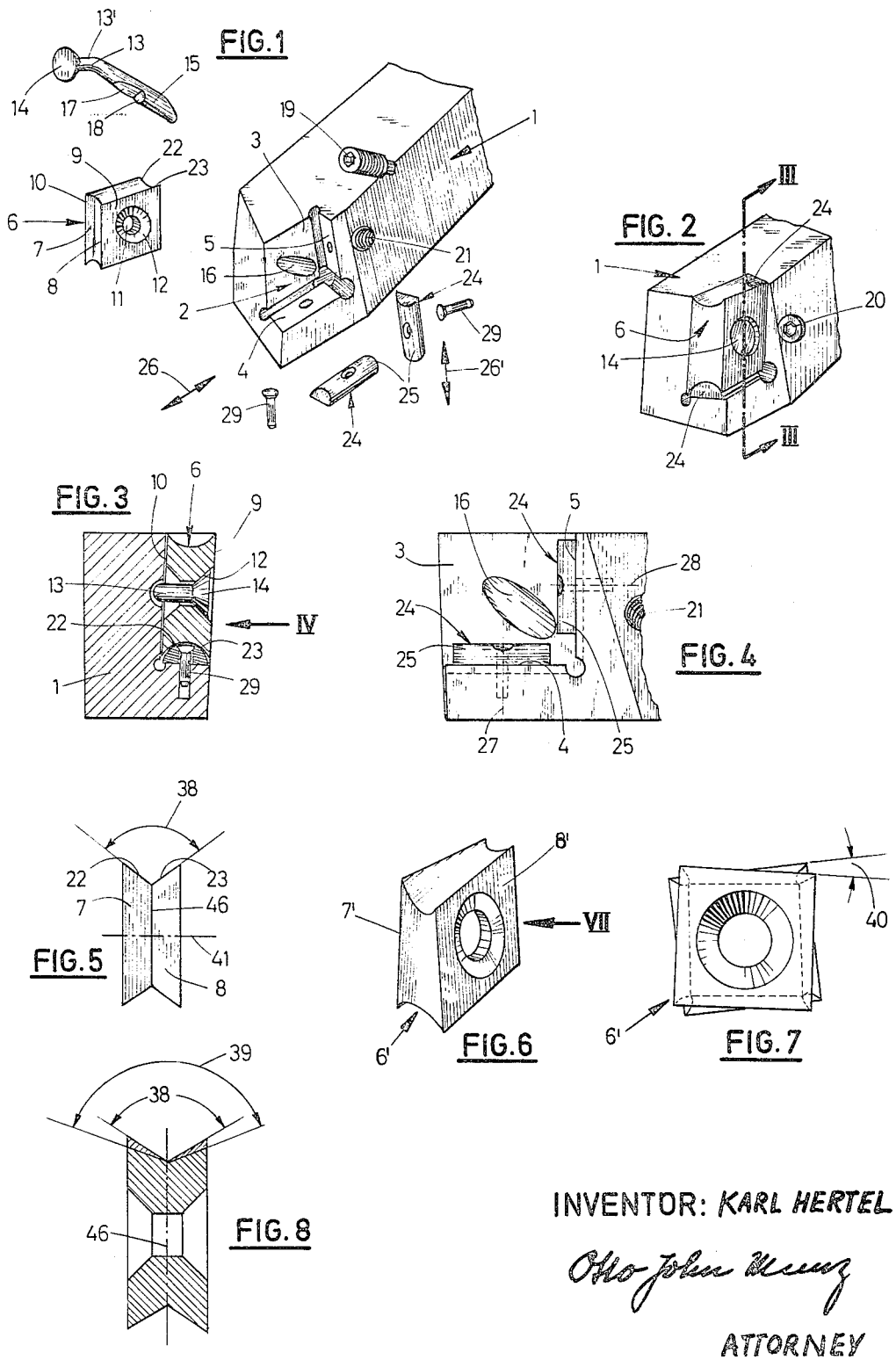

3,490,117
TOOL HOLDER
Karl Hertel, Oedenberger Strasse 29,
Nuremberg, Germany
Filed Jan. 18, 1968, Ser. No. 698,779
Claims priority, application Czechoslovakia,
Jan. 20, 1967, 483/67
Int. Cl. B26d 1/00
U.S. Cl. 29—96
7 Claims

ABSTRACT OF THE DISCLOSURE

A tool holder having a recess for supportingly receiving a cutting member having substantially the shape of two frusta of a pyramid disposed head-to-head one against the other and having square base faces. The recess is defined by a plane face engageable with a base face of the cutting member and two support faces. A support member having an arcuate surface engageable with a lateral face of the cutting member is pivotally secured to each support face to enable the recess to accommodate different shaped cutting members.

---

The invention relates to a clamping tool holder having a recess for supportingly receiving a cutting member or tool.

There are various designs of cutting members having the form of two frusta of a pyramid which are disposed head-to-head against each other and have square base faces which lie in planes parallel with each other, even if the size of the frusta of a pyramid remains uniform. These various embodiments consist in that the lateral edges, positioned opposite each other, of the two base faces of the cutting member extend parallel to each other or may be rotated relatively to each other up to an angle of 10°. These various embodiments are determined by the use required from the cutting member. If the cutting member is to be used as a side tool for the turning of rectangular shoulders or steps on a lathe, then it is, for example, absolutely necessary that the lateral edges, facing each other, of the two base faces of the frusta of a pyramid should be rotated relatively to each other through a predetermined angle, in order that the lateral edges facing the workpiece of the cutting member base face not in immediate use, do not rub along the surface of the machined workpiece, thus damaging it and at the same time being blunted. For roughing, using a cutting edge set obliquely relatively to the workpiece axis, it is, on the other hand, not entirely necessary to rotate relatively to each other the lateral edges positioned opposite each other of the two base areas of the frusta of a pyramid, since there is no danger of contact between the workpiece and the lateral edge, facing it, of the cutting member face not in immediate use. Furthermore, it may be desirable, depending on the desired chip formation to provide for a varying degree of mutual rotation of the lateral edges, facing each other, of the two cutting member base faces, since, with increasing mutual rotation, the turnings produced are increasingly drawn away from the cutting member nose which is in engagement with a workpiece.

With the hitherto-known design of a clamping tool holder having fixed support faces for the lateral faces of the frusta of a pyramid, it is now necessary, in the case of cutting members having varying angular position or parallel position of the lateral edges facing each other of the two base faces of the frusta of a pyramid, that a separate clamping tool holder should be used in every case, especially since, in the event of mutually staggered position of the lateral edges of the two base faces of the frusta of a pyramid, the pitch plane between the frusta of a pyramid no longer extends parallel to the base faces of the frusta of a pyramid. This, however, considerably increases the prime costs and the storage costs.

The present invention is based on the problem of how to provide a clamping tool holder which can be used for cutting members in the form of two frusta of a pyramid disposed head-to-head one against the other and having square, parallel base faces regardless of whether the lateral edges, disposed opposite each other, of the two base faces of the frusta of a pyramid extend parallel with each other or at an angle to each other.

According to the invention there is provided a clamping tool holder comprising a body having a recess therein for supportingly receiving a cutting member having substantially the shape of two frusta of a pyramid disposed head-to-head one against the other and having square base faces, the lateral faces of the frusta of a pyramid forming the cutting faces and the edges of the base faces forming the cutting edges, said recess being defined by a plane face for supporting a base face of the cutting member and two support faces for supporting lateral faces of the cutting member, and a pair of support bodies, one for each support face, each support body comprising a face curved in arcuate manner about an axis extending substantially lengthwise of the support body and adapted in use of the tool holder supportingly to engage a lateral face of the cutting member and each support body being secured to the body to be pivotal about an axis extending perpendicular to its longitudinal axis and substantially parallel to the plane face of the recess. Preferably each support body is displaceable by a predetermined amount perpendicular to its associated pivoting axis, so as to achieve optimum adaptation to the contours of the cutting member.

Due to the arcuate design of the cutting member surfaces, reliable supporting to the cutting member via the lateral faces of the frusta of a pyramid is assured. With this arrangement, the shape of the lateral faces of the frusta of a pyramid may also deviate from the nominal shape, without this having any disadvantageous influence on the supporting, as would be the case with the hitherto-known clamping tool holders having fixed abutment faces for the lateral faces of the frustum of a pyramid. Thus, for example, the cutting member may have, only in the immediate zone of the two base faces, the shape of two frusta of a pyramid base area are ground or built in whereas in the central zone between the two frusta of a pyramid, the shape of the cutting member may deviate from the double frustum of a pyramid shape, in that for example this central zone between the two frusta of a pyramid may be rounded in concave form. Concave rounding of this kind obtains, for example, if the cutting member is manufactured from a square-shaped pre-sintered part, by grinding or milling, before finish-sintering is effected. In this way, the lateral faces between the two frusta of a pyramid base areas are ground or built in such manner that the rotation plane of a profile grinding disc or of a profile miller is located in the pitch plane between the two frusta of a pyramid. A mode of manufacturing of this kind has the further advantage that merely by corresponding pivoting of the rotation plane of the machining tool out of the parallel position relatively to the cutting member base faces, any desired mutual staggering of the frusta of a pyramid can be achieved.

The cutting material of the cutting member preferably consists predominantly of hard metal. However other cutting materials, for example high speed steel or oxide-ceramic material, may be used if desired.

Usually cutting members made from hard metal are finish-sintered in their final form so that further machining, for example by grinding, is then no longer necessary.

The invention will now be described in greater detail merely by way of example, with reference to the accompanying drawings, wherein:

FIGURE 1 is an exploded perspective view of the front side of a clamping tool holder embodying the invention, with the details necessary for the securing of a cutting member also shown;

FIGURE 2 is a perspective view of the front side of the clamping tool holder, with the cutting member inserted in position;

FIGURE 3 is a sectional view taken along the line III—III of FIGURE 2,

FIGURE 4 shows a lateral elevation of the recess in the clamping tool holder looking in the direction of arrow IV of FIGURE 3, the cutting member having been removed;

FIGURE 5 is a lateral elevational view of a cutting member adapted for use in the clamping tool holder of FIGURE 1;

FIGURE 6 is a perspective view of an alternative cutting member having a rounded intermediate zone between the outer faces of the cutting member;

FIGURE 7 is a lateral elevational view taken in the direction of arrow VII in FIGURE 6; and FIGURE 8 is a diagrammatic illustration of a basic member pre-shaped to correspond to the double pyramid shape of the cutting member, the amount of material still to be removed being indicated diagrammatically.

Referring to the drawings, a clamping tool holder has a body 1 which is formed at its front with a recess 2 which is delimited towards three sides by bearing faces 3, 4, 5 and is adapted to receive a cutting member 6. The cutting member 6 has the shape of two frusta of a pyramid 7, 8 which are placed head-to-head one against the other and have square base faces or base areas 9, 10 which extend in planes parallel with each other. The cutting member 6 is formed centrally with a continuous securing bore 11 which is countersunk at each end 12. The bore 11 is adapted to receive a clamping pin 13 formed with a thickened head 14 at its outer end, the said thickened head bearing from the exterior against the countersunk portion 12 of the outer end of the bore 11. The inner end 15 of the clamping or securing pin 13 projects into a bore 16 formed in the interior of the clamping tool holder 1. The securing pin 13 is furthermore formed with a notch 17 near that end which projects into the clamping tool holder 1. In order to draw the clamping pin 13 into the clamping tool holder stem in the direction of the rearward end thereof, the delimiting face 18 of the notch 17 is acted upon by the end face 19 of a compression spring 20 adapted to be screwed into a tapped bore 21 in the clamping holder stem. The tapped bore 21 opens out into the bore 16 of the clamping holder stem near the notch 17. By tightening the clamping pin 13, the cutting member 6 is drawn into the recess 2, in the oblique position relatively to the three bearing faces 3, 4, 5, so that the cutting member abuts firmly in all three directions.

The three lateral delimiting faces 3, 4, 5 of the recess 2 extend at right angles to each other. Interposed in each case between the lateral delimiting faces 4, 5 and the corresponding lateral faces 22, 23 of the two component parts 7, 8, having the shape of frusta of a pyramid, of the cutting member 6 is a support member 24. The support members 24 have, on their side facing the cutting member 6, support faces 25 which are arcuate, having for example the shape of a cylindrical generated surface. The axis of the arcuate curve extends lengthwise of the support member 24 substantially in the longitudinal direction 26 or 26' of the appropriate lateral face to be supported of the cutting member 6. The support members 24 are secured on the clamping tool holder 1 to be pivotal about an axis 27, 28 perpendicular to the line along which they extend longitudinally in the direction 26 or 26'. The securing axes 27, 28 simultaneously extend substantially parallel with the plane face 3 in the direction of the cutting pressure components influencing the lateral delimiting face 4 or 5. As the securing means there is used for example a notched pin 29 having a head arranged to be countersunk in the surface of the associated support member 24. A clearance fit between the periphery of the notch pin and the receiving bore in the support member permits a slight degree of lateral deflection to a predetermined amount of the support member perpendicular to the axis 27, 28 and therewith reliable adaptation to the cutting member contours. The lower delimiting face of the support member 24 is plane and bears in planar fashion on the delimiting face 4 or 5 of the recess 2.

If the cutting member is not to be finish-sintered but is to receive its final form, in the pre-sintered condition, by grinding the intermediate spaces between the two frusta of a pyramid, the pre-sintered base member 34 may also already exhibit the shape of two frusta of a pyramid which abut head-to-head. In this case the angle 38 enclosed by the lateral faces, positioned opposite each other of the two frusta of a pyramid is smaller than the final angle 39 (see FIGURE 8) produced after the machining operation, the said final angle 39 corresponding to the angle 36 of the wedge-shaped periphery of the grinding disc.

For producing the peripheral shape of a cutting member according to FIGURES 6 and 7, wherein the lateral edges positioned opposite each other of the two base faces of the frusta of a pyramid 7' or 8' do not extend parallel to each other, but are rotated through an angle 40 relatively to each other, when production is effected by grinding, the pivot axis of the grinding disc or of the corresponding machining tool will merely be disposed within its plane extending in the grinding feed direction parallel to the perpendicular 41 extending through the square base faces, at a variable angle to the perpendicular corresponding to the desired lateral edge rotation. Solely by means of this angular position of the machining tool is, in the manufacturing process described, the shape of the cutting member illustrated in FIGURES 6 and 7 produced.

By varying the tip of the wedge-shaped bulge on the grinding disc periphery, the intermediate space between the base faces of the frustum of a pyramid may, depending on the chip-removal development desired in respect of the cutting member 6 or 6', be designed to be rounded or wedge-shaped and pointed, as may be desired.

I claim:

1. In a clamping tool holder comprising a body having a recess therein for supportingly receiving a cutting member having substantially the shape of two frusta of a pyramid disposed head-to-head one against the other and having lateral faces and square base faces, the lateral faces of the frusta of a pyramid forming the cutting faces and the edges of the base faces forming the cutting edges of said cutting member, said recess being defined by a plane face for supporting a base face of the cutting member and two support faces for supporting lateral faces of the cutting member, the improvement which comprises a pair of support bodies, one for each support face, each support body comprising a face curved in arcuate manner about an axis extending substantially lengthwise of the support body and adapted in use of the tool holder supportingly to engage a lateral face of the cutting member and each support body being secured to the body to be pivotal about an axis extending perpendicular to its longitudinal axis and substantially parallel to the plane face of the recess.

2. A tool holder according to claim 1, wherein each support body is displaceable by a pre-determined amount perpendicular to its associated pivoting axis.

3. A tool holder according to claim 1, wherein the support body has the shape of a cylinder having a chordal plane surface extending in the longitudinal direction of the cylinder, such chordal plane surface bearing on the associated support face of the recess.

4. A tool holder according to claim 3, wherein the two support faces of the recess extend at right angles to each other and to the plane face of the recess.

5. A tool holder according to claim 1, wherein each support member is pivotally connected with the body of the clamping tool holder by means of a securing member countersunk in the support member.

6. A tool holder according to claim 5, wherein the securing member comprises a notched pin.

7. A tool holder according to claim 1 in combination with a cutting member of which the lateral faces are concave.

References Cited

UNITED STATES PATENTS

| 2,814,854 | 12/1957 | Murray | 29—105 |
| 3,056,186 | 10/1962 | Greenleaf | 29—105 |
| 3,142,110 | 7/1964 | Hertel | 29—96 |

HARRISON L. HINSON, Primary Examiner

U.S. Cl. X.R.

29—105